United States Patent [19]

Coates

[11] Patent Number: 4,465,338
[45] Date of Patent: Aug. 14, 1984

[54] DYES FOR SMECTIC CELLS

[75] Inventor: David Coates, Bishop's Stortford, England

[73] Assignee: ITT Industries, Inc., New York, N.Y.

[21] Appl. No.: 334,498

[22] Filed: Dec. 28, 1981

[30] Foreign Application Priority Data

Jan. 23, 1981 [GB] United Kingdom ............... 8102150

[51] Int. Cl.$^3$ ............................................ G02F 1/13
[52] U.S. Cl. ................................ 350/350 S; 350/351; 350/349
[58] Field of Search ..................... 350/349, 350 S, 351; 252/299.01

[56] References Cited

U.S. PATENT DOCUMENTS

| | | | |
|---|---|---|---|
| 3,960,750 | 6/1976 | Moriyama et al. | 350/349 X |
| 4,040,047 | 8/1977 | Hareng et al. | 350/350 S X |
| 4,196,974 | 4/1980 | Hareng et al. | 350/349 X |
| 4,279,152 | 7/1981 | Crossland et al. | 350/349 X |
| 4,358,392 | 11/1982 | Cognard et al. | 350/349 X |
| 4,360,447 | 11/1982 | Morinaka et al. | 350/349 X |
| 4,363,743 | 12/1982 | Moeller et al. | 350/349 X |
| 4,408,840 | 10/1983 | Imazeki et al. | 350/349 |

FOREIGN PATENT DOCUMENTS 2024844A 1/1980 United Kingdom .

OTHER PUBLICATIONS

Cox, R. "Liquid Crystal Guest-Host Systems," *Molecular Crystals & Liquid Crystals*, vol. 55, pp. 1-32 (1979).
Dewey, A. "Projection Storage Displays Using Laser-Addressed Liquid Crystals," *Physics & Chemistry of Liquid Crystal Devices, Symposium Proceedings* (Feb. 7-8, 1979) San Jose, CA.
Balanson, R. et al. "Sensitivity Improvement in Thermally Addressed Liquid Crystal Display by Incorporation of Dye," *IBM Tech. Disc. Bull.*, vol. 21, No. 5 (Oct. 1978) p. 2007.
Tani, C. et al. "New Electrothermo-Optic Effect in Certain Smectic Liquid Crystal with a Pleochroic Dye Added," *Applied Physics Lett.*, vol. 33, No. 4 (Aug. 15, 1978).

*Primary Examiner*—John K. Corbin
*Assistant Examiner*—Richard F. Gallivan
*Attorney, Agent, or Firm*—T. E. Kristofferson; J. M. May

[57] ABSTRACT

A class of dyes is disclosed for use in smectic display cells which has the common feature of a strong absorption band registering with the emission line of a helium neon laser at 633 nm. The dyes have the general formula

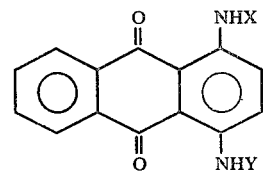

where X is an alkyl group or substituted alkyl group, and Y is an alkyl group, a phenyl group, or a substituted phenyl group.

5 Claims, 2 Drawing Figures

Fig.1.

| EXAMPLE № | X | Y | ORDER PARAMETER S | WAVELENGTH OF ABSORPTION MAXIMA | EXTINCTION COEFFICIENT ε IN $CHCl_3$ AT 630nm |
|---|---|---|---|---|---|
| 1 | $-CH_3$ | —⟨C₆H₄⟩—$C_4H_9$ | 0.53 | 620 and 650 nm | $1.3 \times 10^4$ |
| 2 | $-CH_3$ | —⟨C₆H₃(CH₃)⟩ | 0.42 | 620 and 650 nm | $1.2 \times 10^4$ |
| 3 | $-CH_3$ | —⟨C₆H₄⟩—$OC_4H_9$ | 0.59 | 620 and 650 nm | $1.2 \times 10^4$ |
| 4 | $-CH_3$ | —⟨C₆H₄⟩—$OC_8H_{17}$ | 0.55 | 607 and 648 nm | $1.0 \times 10^4$ |
| 5 | $-C_7H_{15}$ | $-C_7H_{15}$ | 0.19 | 602 and 650 nm | $0.98 \times 10^4$ |

DYES FOR SMECTIC CELLS

CROSS-REFERENCE TO RELATED APPLICATION

This application is related to the invention in U.S. patent application Ser. No. 334,497, filed Dec. 28, 1981 in the name of Derek H. Mash, and assigned to the assignee of the present application. To the extent required for understanding of the present invention, U.S. patent application Ser. No. 334,497 is incorporated herein by reference as if it were set out in full.

BACKGROUND OF THE INVENTION

This invention relates to the use in smectic display cells of anthraquinone dyes having strong absorption registering with the helium neon laser emission line at 633 nm.

Dichroic anthraquinone dyes having previously been used in dyed cholesteric nematic phase change (DCNPC) display cells but their role in DCNPC cells is entirely different from that in a smectic cell. In a DCNPC cell the dye is being used to provide the contrast of color that renders the display visible. For this purpose it must have a relatively high order parameter to produce adequate contrast in the display. In a smectic cell the dye is not used to render the display visible, but is used instead to absorb electromagnetic radiant energy to produce local heating of the smectic layer. For this purpose it will be apparent that order parameter is relatively unimportant, as also is the color of the dye, so long as it is strongly absorbing at the wavelength of the radiant energy. In fact in this instance a broad absorption band tends to be undesirable because it will absorb light that would otherwise usefully contribute to the visibility of the display. Other criteria for the dye are that it shall be chemically, photochemically, and thermally stable, and, on account of the thinness of the liquid crystal layer of a typical smectic cell, that it shall have a high extinction coefficient at the wavelength of the radiant energy.

SUMMARY OF THE INVENTION

According to the present invention there is provided a smectic display cell incorporating a smectic layer of material in which has been dissolved a dye having a strong optical absorption band registering with the helium neon laser emission line at 633 nm which dye satisfies the general formula

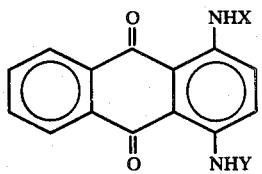

where X is an alkyl group or substituted alkyl group and Y is an alkyl group, a phenyl group, or a substituted phenyl group.

Examples of suitable substituted phenyl groups include alkyl-, alkoxy-, and dialkylamino-, substituted phenyl groups. X may usually be methyl, and by varying the nature of Y in particular, the order parameter of the dye can be varied without substantially changing the absorption at 633 nm.

BRIEF DESCRIPTION OF THE DRAWING

FIG. 1 is a table that lists some of the properties of certain specific examples of the present invention.

DETAILED DESCRIPTION OF THE INVENTION

Figure 2:
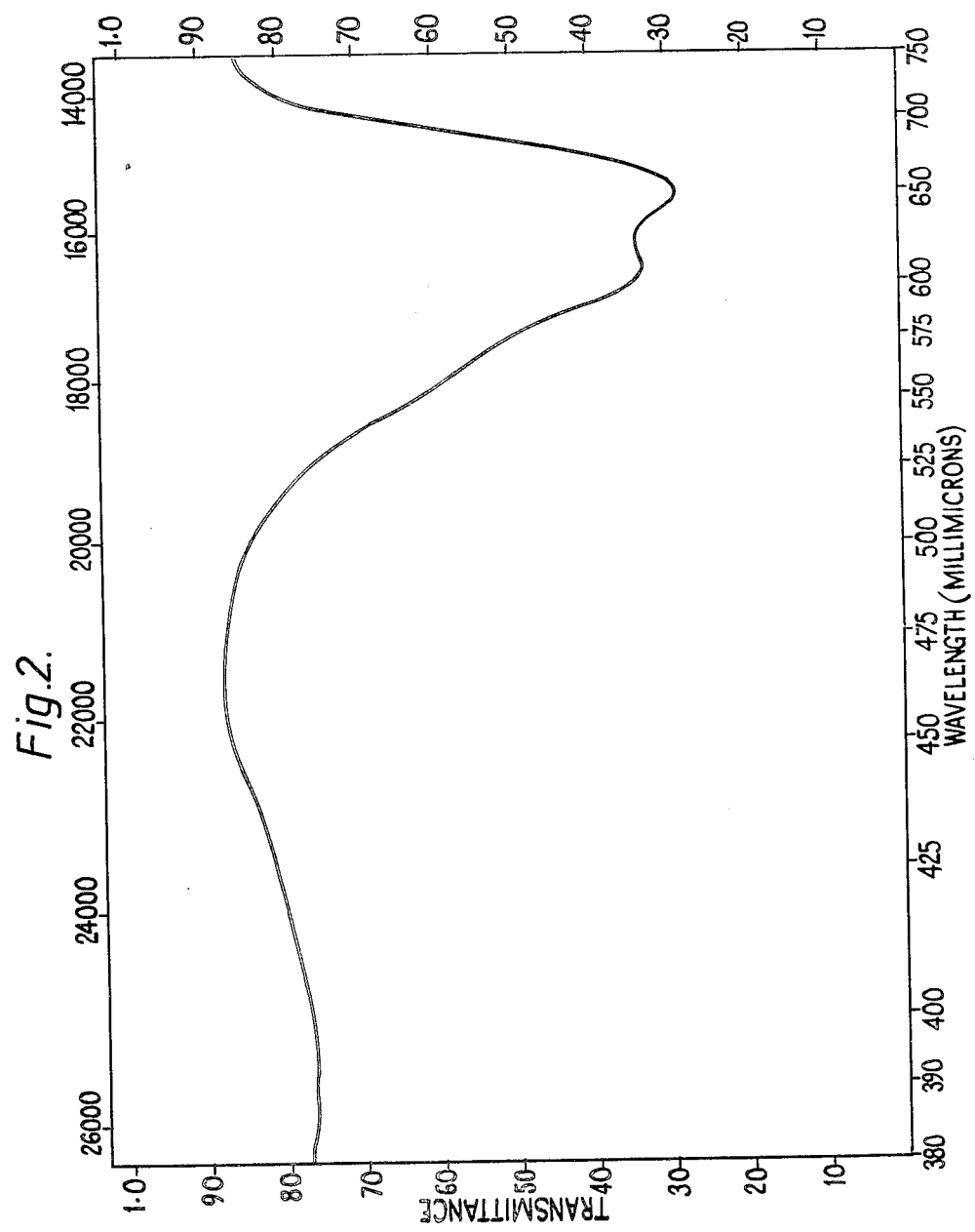
FIG. 2 depicts the spectral absorption characteristic of the fourth of the examples.

The quoted order parameters were measured by conventional methods using as the host liquid crystal the nematic mixture marketed by Merck Sharpe & Dohme under the designation ZLI 1132. Measurements of the absorption maxima were made at 20° C. using the same host material. A very slight shift in the wavelength of the absorption maxima occurs when the dyes are dispersed in a smectic host such as that marketed by BDH under the designation Sl. The spectrum of FIG. 1 was made using Sl as the host material.

In an accelerated stability test, using an ultraviolet lamp marketed by General Electric under the designation 'Black Light', the absorption of the first exemplified dye 1 no fading was observed to result from an exposure of 3,000 hours. For the purpose of this test dye was dissolved as a 2% solution in the abovementioned nematic host ZLI 1132 to which had been added a small quantity of the biphenyl cholesteric marketed by BDH under the designation CB 15. (The cholesteric was added to impart a twist so that as much of the light was absorbed as possible). A twelve micron thick layer of this dye solution was contained in a cell formed by two 1.5 mm thick glass plates and a perimeter seal. The cell was placed 15 cm from the lamp.

The exemplified dyes for which Y is a substituted phenyl group were prepared after the method described in United Kingdom Patent Specification No. 308049. Thus to produce the 1st example, 1-N-methylamino-4-N-(4-butylphenyl)amino-anthraquinone, an intimately mixed mixture of potassium acetate, (4.5 g) copper acetate (0.05 g), 4-butyl aniline (1.6 g), 4-bromo-1-N-methylaminoanthraquinone (2 g), and water (1 ml) was heated and stirred at 100° C. for 16 hours. The mixture was then boiled with dilute hydrochloric acid and extracted with dichloromethane and chromatographed on neutral alumina using dichloromethane as eluent. Crystallization from ethanol gave about 0.7 g of pure dye.

The exemplified dye for which Y is an alkyl group, example 5, 1,4-bis-N-heptylamino anthraquinone was prepared after the method described in the Journal of the American Chemical Society Volume 85 page 1975 (1963). In this instance a mixture of leucoquinizarin (1.2 g), heptylamine (3.9 g) and pyridine (15 ml) was refluxed for 18 hours and then poured into dilute hydrochloric acid. The resultant precipitate was washed with water and chromatographed on alumina using dichloromethane as eluent and crystallized from 2-methoxyethanol to give 1 g of pure dye.

A smectic cell incorporating such a dye or mixture of such dyes can be addressed by traversing a focussed laser beam over its surface so as to produce a track whose appearance is different from that of the background. Such tracks are produced by the local heating produced Such tracks are produced by the local heating produced by the absorption of the laser light. This local heating is arranged to take the heated portion of the liquid crystal layer into a non-smectic state, usually the isotropic state, and then allow it to cool to revert to the smectic state. Under certain conditions, depending inter alia upon cooling rate, the cooling liquid assumes a focal-conic light-scattering state upon reversion; while upon other conditions the cooling liquid assumes an aligned state upon reversion which does not scatter light. For example, a smectic cell can be constructed to confine a thin layer of liquid crystal exhibiting a smectic phase, and the interior of surfaces of the cell are treated to promote homeotropic alignment of the liquid crystal molecules adjacent those surfaces, then the visual clarity of such a layer in the isotropic liquid phase is preserved as it is slowly cooled to transform it into the smectic phase. This clarity is preserved in the smectic phase because the slow rate of cooling enables the liquid crystal molecules to assume homeotropic alignment. If however the cell is cooled very rapidly the random orientation of the molecules in the nematic phase becomes transformed into a disordered orientation state in the smectic phase, with the result that the layer scatters light in the visible region of the spectrum.

The invention has been described by reference to specific examples. Those skilled in the art will recognize that modifications other than those specifically mentioned can be made without departing from the spirit of the invention and the scope of the present invention is defined solely by the appended claims.

I claim:

1. A smectic display cell incorporating a smectic layer of material in which has been dissolved a dye having a strong optical absorption band registering with the helium neon laser emission line at 633 nm which dye satisfies the general formula

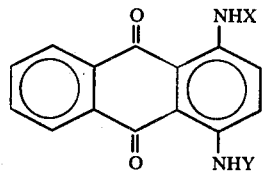

where X is an alkyl group and Y is an alkyl group having at least 7 carbons, or a substituted phenyl group.

2. A smectic display cell as claimed in claim 1 wherein X is a methyl group.

3. A smectic display cell as claimed in claim 1 or 2 wherein Y is an alkyl substituted phenyl group.

4. A smectic display cell as claimed in claim 1 or 2 wherein Y is an alkoxy substituted phenyl group.

5. A smectic display cell as claimed in claim 1 or 2 wherein Y is a dialkylamino substituted phenyl group.

* * * * *